(12) United States Patent
Sønderborg

(10) Patent No.: US 8,720,356 B2
(45) Date of Patent: May 13, 2014

(54) METHOD OF MAKING A WOVEN SAILCLOTH, A WOVEN SAILCLOTH, A SAIL MADE FROM A WOVEN SAILCLOTH AND A LAMINATED SAILCLOTH MADE FROM WOVEN SAILCLOTH

(75) Inventor: Claus Sønderborg, Barcelona (ES)

(73) Assignee: Lise Sonderborg APS, Silkeborg (DK)

( * ) Notice: Subject to any disclaimer, the term of this patent is extended or adjusted under 35 U.S.C. 154(b) by 55 days.

(21) Appl. No.: 13/380,430

(22) PCT Filed: Jun. 22, 2010

(86) PCT No.: PCT/DK2010/050155
§ 371 (c)(1),
(2), (4) Date: Mar. 19, 2012

(87) PCT Pub. No.: WO2010/149165
PCT Pub. Date: Dec. 29, 2010

(65) Prior Publication Data
US 2012/0160144 A1    Jun. 28, 2012

Related U.S. Application Data

(60) Provisional application No. 61/269,275, filed on Jun. 23, 2009.

(30) Foreign Application Priority Data

Jun. 23, 2009   (DK) ................................. 2009 00772

(51) Int. Cl.
    *B63H 9/06*    (2006.01)
(52) U.S. Cl.
    USPC .......................... 114/102.29; 156/84; 442/181
(58) Field of Classification Search
    USPC ....... 114/102.29, 102.31, 102.33; 139/420 R, 139/421, 425 R, 426 R; 156/85, 277; 428/89, 428/90; 442/208, 181, 184
    See application file for complete search history.

(56) References Cited

U.S. PATENT DOCUMENTS 3,856,598 A     12/1974  Gregorian et al.
4,499,842 A  *   2/1985  Mahr ........................ 114/102.31
(Continued)

FOREIGN PATENT DOCUMENTS

| GB | 828696 | | 2/1960 |
| IE | 940003 | A2 | 5/1995 |
| WO | 95/18881 | A1 | 7/1995 |

OTHER PUBLICATIONS

International Search Report from International Patent Application Publication No. WO2010/149165 A1, dated Sep. 10, 2010.

*Primary Examiner* — Lars A Olson
(74) *Attorney, Agent, or Firm* — Michael Best & Friedrich LLP

(57) ABSTRACT

A method of making a woven sailcloth comprising the steps of: selecting a first set of yarns comprising at least partially a first type of yarn; selecting a second set of yarns comprising at least partially a second type of yarn; weaving the first set of yarns and the second set of yarns such that the first set of yarns are arranged along a first direction and the second set of yarns are arranged along a second direction which is different from the first direction, choosing a chemical solution which has the property of shrinking the first type of yarn in its longitudinal direction more than the second type of yarn when the first type of yarn and the second type of yarn are exposed to said chemical solution, and exposing the woven sailcloth to said chemical solution. A sailcloth is also disclosed based on said method. A sail made from woven sail cloth is also disclosed. A laminated sailcloth comprising a layer of woven sailcloth is also disclosed.

16 Claims, 5 Drawing Sheets

(56) References Cited

U.S. PATENT DOCUMENTS

| | | |
|---|---|---|
| 5,304,414 A | 4/1994 | Bainbridge et al. |
| 7,104,210 B2 * | 9/2006 | Skinner et al. .......... 114/102.33 |
| 2003/0111128 A1 | 6/2003 | Hannigan et al. |
| 2007/0144957 A1 | 6/2007 | Makinen et al. |

* cited by examiner

METHOD OF MAKING A WOVEN SAILCLOTH, A WOVEN SAILCLOTH, A SAIL MADE FROM A WOVEN SAILCLOTH AND A LAMINATED SAILCLOTH MADE FROM WOVEN SAILCLOTH

CROSS-REFERENCE TO RELATED APPLICATIONS

This is the U.S. National Stage entry of International Patent Application No. PCT/DK2010/050155, filed on Jun. 22, 2010, which claims priority to Danish Patent Application No. PA 2009 00772, filed on Jun. 23, 2009 and U.S. Provisional Patent Application No. 61/269,275, filed on Jun. 23, 2009, the contents of all of which are herein incorporated by reference.

The current invention relates to a method for making a woven sailcloth, a woven sailcloth, a sail made from woven sailcloth and a laminated sailcloth made from woven sailcloth.

DESCRIPTION OF RELATED ART

A woven sailcloth has traditionally been woven from yarns made from one single fibre material such as nylon or polyester. Although yarns or fibres of different thicknesses, but of the same material, are often used in a woven sailcloth, yarns of different fibre materials are rarely mixed in a woven sailcloth.

While both polyester and nylon are generally suitable fibres for a woven sailcloth they have some limitations when used in high performance or large yacht applications where their strength-to-weight ratio is often considered too low to meet the requirements.

Some attempts have been made where yarns made from other fibre materials with better strength-to-weight ratio than nylon or polyester were introduced in woven sailcloth, but such attempts have only been moderately successful. This is due to some compromises which have partly offset the advantages of using yarn or fibres of such materials.

Due to their low strength-to-weight ratio, woven sailcloth is therefore considered less than ideal for large yacht applications in general and is rarely used for high performance applications except for specialty sails such as spinnakers.

Desired Qualities of a Woven Sailcloth

Among the desired and most important qualities of a woven sailcloth intended for high performance and large yacht applications are low weight and high stretch resistance.

A low weight sailcloth will reduce the final weight of the sail made from the sailcloth and thus cause less heel of the sailboat due to the weight of the sail itself. Furthermore a lighter sail will fill with air faster and under lighter wind pressure and will thus also be useful in lighter wind conditions.

A sailcloth with a high stretch resistance will allow a sail made from such sailcloth to better maintain its designed shape under wind pressure and thus improve the performance of the sail.

Furthermore, for a specific application, a lighter sailcloth with high stretch resistance per weight unit can replace a heavier sailcloth with lower stretch resistance per weight unit and consequently lower the total weight of the sail without sacrificing its desired stretch resistance. Higher stretch resistance per weight unit is therefore a desirable characteristic of a sailcloth as it can indirectly lower the weight of a sail by allowing a particular sail to be made from a lower weight sailcloth.

For simplicity, stretch resistance of a sailcloth is generally measured in three independent directions as shown in FIG. 1.
1. Warp direction (also called the machine direction), see arrow A
2. Weft direction (a 90 degree angle to the warp direction), see arrow B
3. Bias direction (a 45 degree angle to both the warp and the weft direction), see arrow C Due to the nature of weaving it is not possible to obtain the same high stretch resistance in all three of the above mentioned independent directions. While the stretch resistance in the warp and the weft directions comes from the yarns running in those directions, this is not the case for the bias direction as there are no yarns running in this direction. The stretch resistance in the bias direction of a sailcloth comes from the mechanical friction in the intersections between the warp yarns and the weft yarns. The warp and the weft yarns have a natural 90 degree angle to each other when the sailcloth is in a relaxed state. When stretching a woven sailcloth in its bias direction, the warp and the weft yarns will have to reposition themselves in relation to each other and the more intersections between warp and weft yarns per area unit, and the higher the friction is in each intersection, the more resistance to stretch the sailcloth will have in its bias direction.

Increasing the bias direction stretch resistance can be done in several ways:
1. Using finer yarns and thus increasing the number of yarn intersections per unit area.
2. Weaving a denser weave, and thus increasing the number of yarn intersections and the mechanical friction within each of these, the latter due to higher tension on the yarns within the woven cloth.
3. Shrinking the woven sailcloth, by causing the length of the yarns to decrease, thereby increasing the density of the weave.

Shrinking the woven sailcloth is a typical way to increase the density of a sailcloth beyond what is obtainable from weaving techniques alone. The shrinking is traditionally done by applying heat to the woven sailcloth. This is known as "heat-setting". Depending on the yarn material used, the yarns in the sailcloth can shrink as much as 20% in both the warp and the weft direction although most yarns will shrink less that that.

However, even a combination of all the above mentioned three methods will not be sufficient to give the sailcloth its desired strength in its bias direction. The bias direction is therefore further strengthened by applying a resin or adhesive that fills the gaps between the warp and weft yarns and helps to keep the warp and weft yarns in the same relative position to each other. The stretch resistance in the bias direction is therefore increased. Still, the stretch resistance in the bias direction will not reach that of the warp and weft directions and the bias direction is therefore often a weak point of a woven sailcloth.

Improving the Desired Qualities of a Woven Sailcloth

Traditionally a woven sail cloth has been made from Polyester (typically Polyethylene terephthalate) yarns. Among many other desirable qualities, polyester yarns have a good ability to shrink and are therefore a suitable fibre for a woven sailcloth with good stretch resistance in its bias direction.

However, polyester itself has a fairly low stretch resistance per weight unit. A woven sailcloth from polyester fibre is therefore not particularly suitable for high performance applications where low weight and high stretch resistance in the warp or weft direction of the sailcloth is desired.

An obvious way to improve the stretch resistance of a woven sailcloth would be to replace the polyester yarns, fully or partly, with yarns having a higher stretch resistance per weight unit than polyester. Such yarns could be made from fibres such as aromatic polyamide (commonly known as Aramids), sold under trade names such as Kevlar, Twaron and Technora, or UHMWPE, sold under trade names such as Spectra and Dyneema, or they could be made from fibres such as Carbon or Vectran; an aromatic polyester produced by Kuraray Co, or from PBO sold under the trade name Zylon. Other fibres could also be used as will be known to the person skilled in the art.

While having a higher stretch resistance than that of polyester, these fibres also have much lower shrinking abilities than polyester. When exposed to heat they either shrink very little or not at all. A woven sail cloth made entirely from any of the fibres mentioned above will therefore not be able to shrink by heat-setting and won't thereby gain increased stretch resistance in its bias direction. The increased stretch resistance in its warp and weft directions, in comparison to woven polyester sailcloth, is therefore obtained at the expense of the stretch resistance in its bias direction which will often be lower than that of woven and shrunken polyester sailcloth. For this reason, attempts to make woven sailcloth entirely from any of the above mentioned fibres have largely been abandoned.

Attempts (see for example U.S. Pat. No. 5,304,414) have been made to weave a sailcloth partly from polyester yarns and partly from yarns having a higher stretch resistance than polyester, such as the fibres mentioned above. In such a sailcloth, hereafter referred to as a hybrid sailcloth, the polyester yarns have typically been replaced by a different yarn in a repetitive manner, such as every $5^{th}$, every $8^{th}$ or every $n^{th}$ yarn, in either its warp direction, its weft direction or both, being replaced by a low stretch yarn made from other fibres than polyester. While the stretch resistance of a hybrid sailcloth can be increased in its warp or weft direction, in comparison to a woven polyester sailcloth, problems will occur when trying to increase stretch resistance in its bias direction by shrinking it. While the polyester yarns will shrink when exposed to heat, the low stretch yarns, such as the ones mentioned above, will either shrink very little or not at all. This means that when the woven hybrid sailcloth is heat-set, the polyester yarns will shrink more than the low-stretch yarns made from other fibres than polyester. In the shrunken sailcloth, the low-stretch yarns will consequently have less tension in the weave than the polyester yarns due to the low-stretch yarns being longer than the polyester yarns.

When applying load to such a hybrid and shrunken sailcloth, i.e. from wind force, the low-stretch yarns will not bear any load as they are longer than the polyester yarns and consequently not under tension. The polyester yarns will bear the entire load and consequently stretch, while the low-stretch yarns will first need to straighten before their stretch resistance can support the woven sailcloth.

Only when the polyester yarns have stretched sufficiently for the low-stretch yarns to have been straightened completely, will the low-stretch yarns start bearing the loads applied to the sailcloth. The initial stretch resistance of the hybrid sailcloth, after shrinking it, will therefore not be any better than that of an all-polyester sailcloth. It may in fact be worse as the amount of polyester yarns will be lower than in an all-polyester sailcloth. In addition, as polyester yarns, and consequently the hybrid sailcloth, can shrink as much as 15% the sailcloth could have stretched beyond recovery before the low-stretch yarns even came into effect.

If, on the other hand, the hybrid sailcloth is not shrunk the stretch resistance in the warp or weft direction will be improved by the introduction of low-stretch yarns but only at the expense of the stretch resistance in the bias direction which will not be any better than that of any other sailcloth, made from polyester or other yarns, that has not been shrunk.

Methods have been developed which attempt to strike a balance between these two extremes. In patent IE 940003 by Colin Appleyard the polyester yarns are pre-shrunk in a way so as to allow them to shrink when the woven sailcloth is heat-set, although not to shrink as much as they would otherwise have done, had they not been pre-shrunk. Still, they will shrink more than the low-stretch yarns being used in the same direction of the sailcloth. This method allows a hybrid sailcloth to obtain some improvement of the bias direction stretch resistance by shrinkage, while accepting some difference in tension between the polyester yarns and the low-stretch yarns, and consequently some compromise on stretch resistance of the weft and/or the warp direction.

Another problem with hybrid sailcloth relates specifically to yarns made from Ultra high molecular weight polyethylene (UHMWPE) fibres such as Spectra or Dyneema fibres. These yarns are advantageous since they have a high modulus of elasticity as well as a high tensile strength while they are not as sensitive to UV light as other fibres having a high modulus of elasticity, except for carbon fibre. While these yarns in many ways would be ideal for weaving a hybrid sailcloth they have a melting point of around 150 degree Celsius and may become permanently damaged at temperatures of around 100 degrees celsius. Polyester shrinks at temperatures of around 150 degrees celcius or higher which effectively means that an attempt to heat-set a hybrid sailcloth containing both polyester yarns and UHMWPE yarns will result in the UHMWPE yarns melting or being permanently damaged.

SUMMARY OF PRIOR ART

In a woven hybrid sailcloth, where two or more yarns, having different heat-shrinking abilities, are mixed in one single direction of the sailcloth, there is a trade-off between, on one hand, its bias direction stretch resistance, and on the other hand its warp and weft direction stretch resistance. The bias direction stretch resistance of such a sailcloth can be improved by heat-setting, only at the expense of the warp and weft direction stretch resistance. This trade-off will be referred to as the stretch resistance trade-off of a hybrid sailcloth.

Moreover, a hybrid sailcloth where one yarn is made from UHMWPE fibres, cannot be shrunk using traditional heat-setting as this technique does not allow polyester, or other known yarns with good shrinking ability, to shrink without melting or damaging the UHMWPE yarns.

SUMMARY OF THE INVENTION

It is therefore a first aspect of the current invention to provide a method of making a hybrid shrunken sailcloth, which has high stretch resistance in the warp, weft and bias directions.

Another aspect of the current invention is to provide a method of making a hybrid shrunken sailcloth, where one of the yarns is made of UHMWPE fibres.

The above mentioned aspects are provided in part by a method comprising the steps of:
- selecting a first set of yarns, comprising at least partially a first type of yarn,
- selecting a second set of yarns, comprising at least partially a second type of yarn,
- weaving the first set of yarns and the second set of yarns such that the first set of yarns are arranged along a first direction and the second set of yarns are arranged along a second direction which is different from the first direction,
- choosing a chemical solution which has the property of shrinking the first type of yarn in its longitudinal direction more than the second type of yarn when the first type of yarn and the second type of yarn are exposed to said chemical solution, and
- exposing the woven sailcloth to said chemical solution.

By exposing the woven sailcloth to a chemical solution as mentioned above, it is possible to cause the fibres in the first direction to shrink more than the fibres in the second direction. This gives many possibilities to adjust the properties of the resulting sailcloth as will be discussed below.

It should be noted that in the method as disclosed above, a distinction is to be made between "sets of yarns" and "types of yarns". The phrase "a set of yarns" is used to describe a set which could comprise one or more different types of yarns. A type of yarn is meant to describe a yarn of a particular chemical composition and with a particular set of properties, for example two non limiting examples are PET yarns and Dyneema yarns. It should also be noted that the first and second type of yarn could be of the same chemical composition but having different properties. For example, one of the yarns could be pre-shrunk while the other is not, thus having different properties, even though they both have the same chemical composition.

Furthermore it should be noted that that the phrase "the first type of yarn shrinks more than the second type of yarn" as used for example in current claims 1 and 2, should be interpreted as describing the shrinkage properties of the yarns themselves without reference to the shrinkage of the yarns in the actual woven sailcloth. The actual shrinkage of the yarns in the actual woven sailcloth will be affected by many factors for example the type of weave used and the properties of the other yarns used in the weave.

It should be noted that the term "chemical solution" as used in this specification should be understood as encompassing chemical solutions and other forms of chemicals in liquid form. The terms "chemical solution", "chemical shrinking solution", "chemical shrinking agent" and "mixture of chemical shrinking agents" are therefore used interchangeably in this specification. For example, a chemical shrinking solution according to example 1 below is Dichloromethane. From a purely dictionary definition, dichloromethane is a solvent and is not a chemical. However according to the current specification, it should be considered to be included in the term "chemical solution". In most cases, some form of chemical solution will be used, therefore the term chemical solution has been used in the claims.

In one particular embodiment of the above method, the first type of yarn could have a different chemical composition than the second type of yarn.

In another embodiment the yarns which are arranged along the first direction could be selected such that their actual longitudinal shrinkages in the woven sailcloth are within 3% of each other and the yarns which are arranged along the second direction could be selected such that their actual longitudinal shrinkages in the woven sailcloth are within 3% of each other. It should here be noted that in contrast to the wording of current claims 1 and 2 which reflects the shrinkage of the yarns without reference to the sailcloth, here reference is made to the actual shrinkage in the woven sailcloth. For example, a yarn could have a shrinkage of 10% when exposed to a particular chemical solution when free of a weave, but when integrated in a weave only have a shrinkage of for example 5% since the weave will prevent the yarn from shrinking the full 10%.

In order to increase the strength of the sail along a particular direction, the second set of yarns could at least partially comprise a type of yarn made at least partially from a fibre which is considered to have a high modulus of elasticity. As non-limiting examples, such fibres could be chosen from the group of Kevlar, Twaron, Technora, Vectran, Carbon, Zylon, UHMWPE, Spectra or Dyneema fibres. It should be noted that fibres which are considered to have a high modulus of elasticity, for the purpose of the present specification, are fibres with an initial specific modulus of elasticity, of over 400 grams/denier. The initial specific modulus of elasticity shall here be defined as the initial elastic modulus per mass density of the fibre, prior to any pre-stretching, heat treatment or other treatment intended to adjust the modulus of elasticity of the fibre. Fibres having an initial specific modulus of elasticity of 400 grams per denier or higher will therefore be referred to as high modulus fibres and yarns made from such fibres will be referred to as high modulus yarns in this specification.

The invention also relates to a woven sailcloth manufactured according to the method of the invention.

The invention also relates to a woven sailcloth comprising a first set of yarns arranged in a first direction and a second set of yarns arranged in a second direction which is different from the first direction, and where the first set of yarns comprises at least partially a first type of yarn and the second set of yarns comprises at least partially a second type of yarn and where the first and second set of yarns are woven together, and where the woven sailcloth has been exposed to a chemical solution after the weaving process was complete which caused the first type of yarn to shrink in its longitudinal direction more than the second type of yarn in its longitudinal direction.

It should also be noted that the actual weave which is used in the woven sailcloth will have an effect on the amount of shrinkage along the longitudinal directions of the first and second set of yarns. The tighter the weave, the less the yarns will actually shrink in the longitudinal direction. However, the yarns will still attempt to shrink thereby increasing the tension in the yarns. Therefore, the above paragraph uses the phrase "first type of yarn" and "second type of yarn" instead of "first set of yarns" and "second set of yarns".

In one particular embodiment of such a sailcloth the first type of yarn is a polyester or nylon yarn and the second type of yarn is a yarn with a high modulus of elasticity; the second set of yarns further comprises a third type of yarn which is a polyester or a nylon yarn. In said embodiment the first type of yarn has been shrunken in its longitudinal direction after the weaving process was complete whereas the third type of yarn has not been shrunken.

In another particular embodiment of such a sailcloth, the second type of yarn is UHMWPE yarn, for example Dyneema or Spectra, and the first type of yarn has been shrunken after the completion of the weaving process.

The invention also relates to a laminated sailcloth where one of the layers of the laminated sailcloth could be a woven sailcloth according to the current invention.

The invention also relates to a sail made at least partially from a sailcloth according to the current invention. In this case, the sailcloth could be arranged such that the second set of yarns are arranged essentially parallel to one of the estimated main load directions of the sail.

It should be emphasized that the term "comprises/comprising/comprised of" when used in this specification is taken to specify the presence of stated features, integers, steps or components but does not preclude the presence or addition of one or more other features, integers, steps, components or groups thereof. For example, in the description and the claims an example is presented of a laminated sailcloth where "one" layer of the laminated sailcloth is a woven sailcloth. However, this should be understood as "at least one" layer. Any number of layers of woven sailcloth should be included within the scope of the current invention.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

A sailcloth can be cut into sail panels and subsequently assembled into a sail in several different ways. The most common of these being cross-cut sail panels (see FIG. 3) and radial-cut sail panels (see FIG. 2). These two different techniques have been developed in response to the nature of weaving which allows a woven sailcloth to have higher stretch resistance in one of either the warp direction or the weft direction, at the expense of the stretch resistance of the other.

Figure 1:
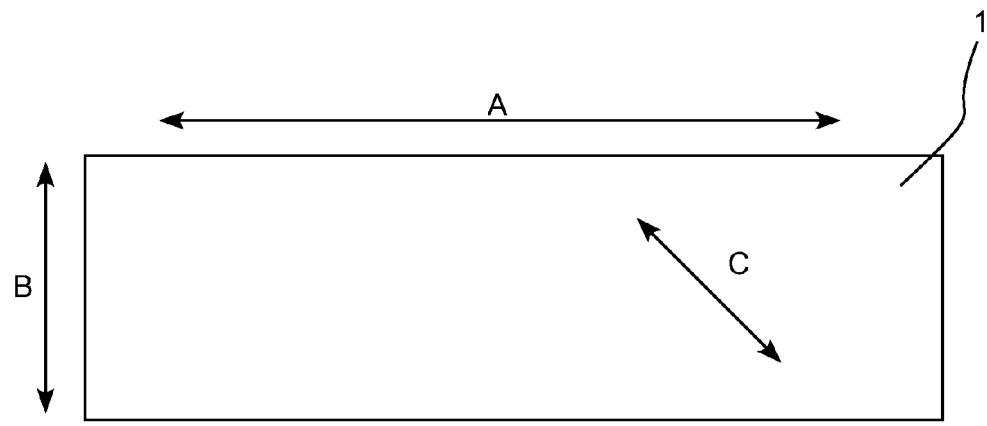
FIG. 1 shows a schematic view of a piece of sailcloth.
Figure 2:
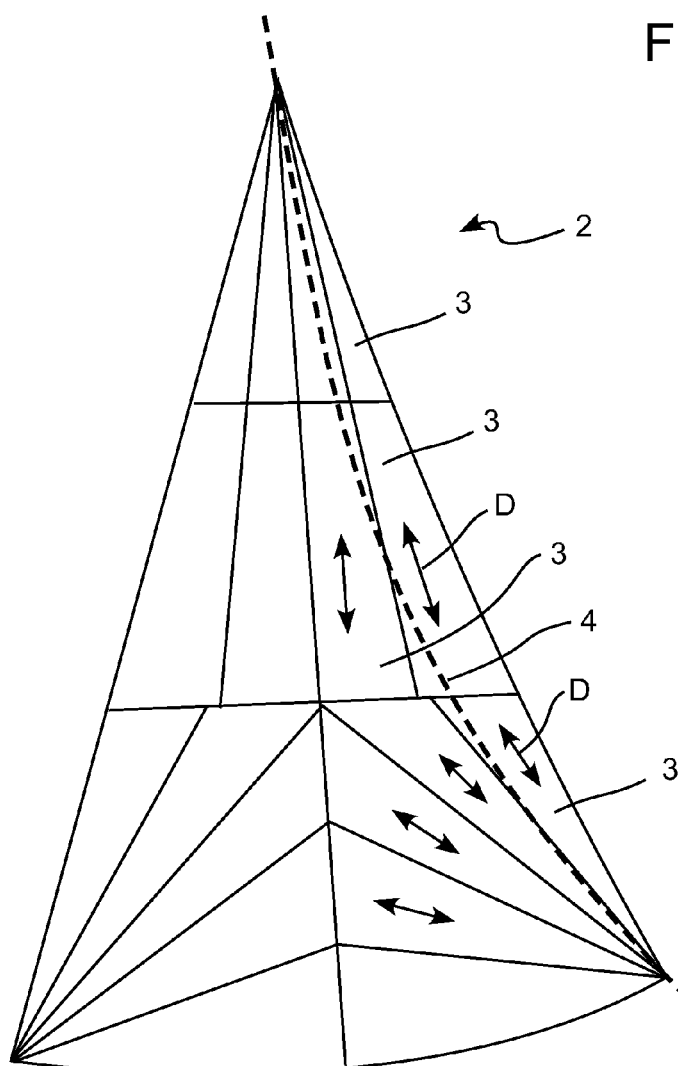
FIG. 2 shows a schematic view of a radial cut sail.

A sailcloth intended for a radial-cut sail should ideally have higher stretch resistance in its warp direction as the panels are subsequently assembled into a sail in such a way that the highest loads of the sail are aligned with the warp direction of the sailcloth. This is shown in FIG. 2 which shows a radial cut sail 2, being assembled of a number of panels 3. A dashed line 4 represents a perceived load line to which the warp yarns of the radial cut panels are approximately aligned. The warp yarns in the panels are identified with arrows D.

Figure 3:
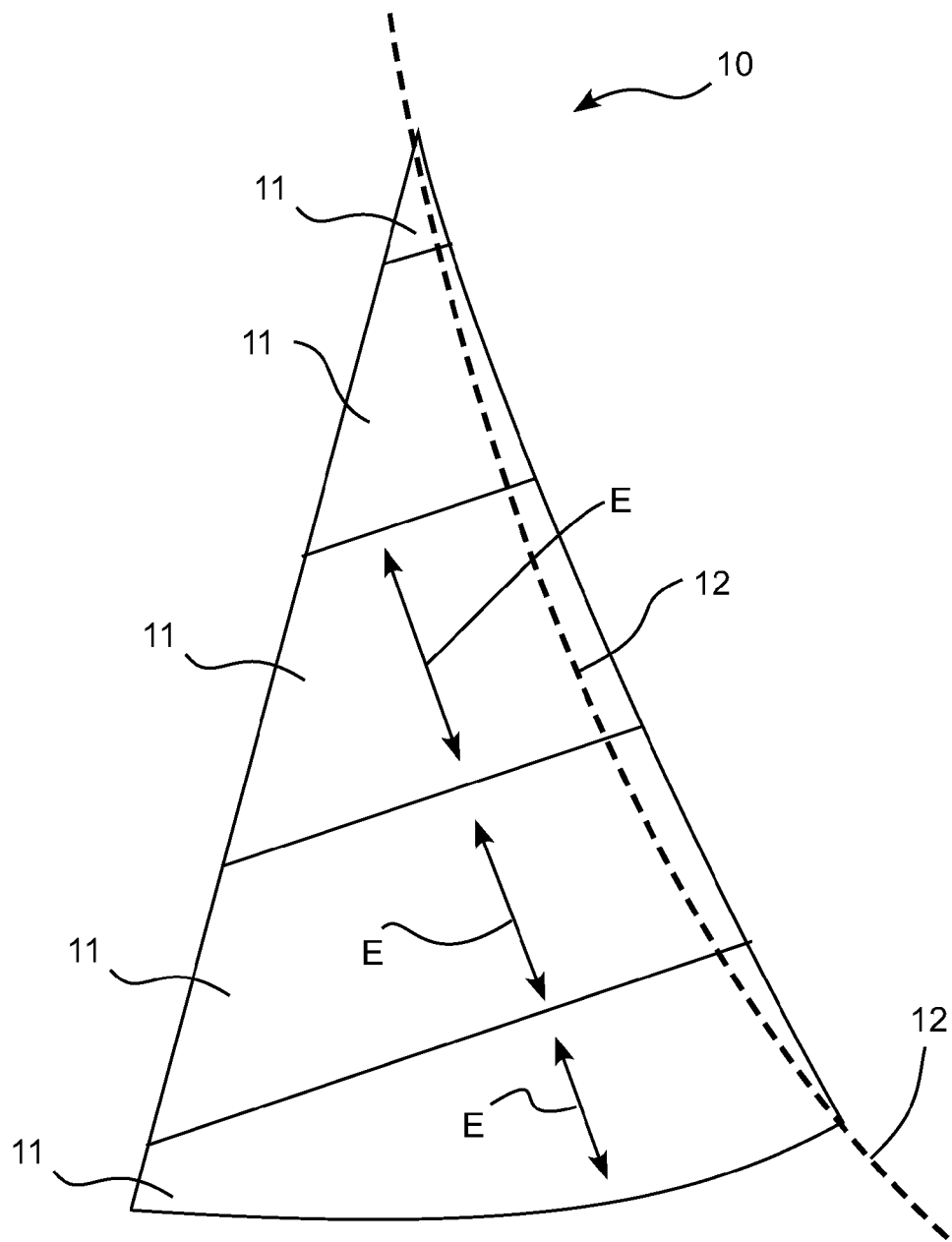
FIG. 3 shows a schematic view of a cross cut sail.

Likewise, a sailcloth intended for cross-cut sail panels should have higher stretch resistance in its weft direction as the panels are subsequently assembled into a sail in such a way that the highest loads of the sail are aligned with the weft direction of the sailcloth. FIG. 3 shows a cross cut sail 10 made from a number of panels 11. As in FIG. 2, a perceived load line, to which the weft yarns of the sail panels are approximately aligned, is shown with a dotted line 12. The arrows E on the panels 11 show the weft direction of the sail cloth.

In the following, the direction of a woven sailcloth where higher stretch resistance is desired, whether its warp or its weft direction, will be called the "main load-bearing direction" of the sailcloth. The direction perpendicular to the main load bearing direction of a woven sailcloth, whether its warp or its weft direction, will be called the stabilising direction. The stabilising direction will also be load-bearing, as will any other direction of the sailcloth including the bias direction, but not to the same extent as the main load-bearing direction.

Under the present invention a sailcloth is woven, using traditional weaving methods. Where applicable, traditional techniques for improving the bias direction stretch resistance such as weaving a denser weave or using finer yarns could also be used. The bias direction stretch resistance is then further improved by shrinking the woven sailcloth, using a new technique under which the woven sailcloth is shrunk by exposing it to a chemical shrinking agent or a mixture of chemical shrinking agents.

This chemical shrinking technique has some noticeable advantages over traditional heat-setting methods. Most important are the following:

1. The chemical shrinking process can take place at low temperatures, such as between 20 and 50 degrees Celsius. This process can therefore shrink a woven sailcloth containing UHMWPE yarns, such as Dyneema or Spectra, without damaging or melting the UHMWPE yarns or other yarns unable to resist the high temperatures associated with traditional heat-setting. For example, in one application of the present invention a sailcloth containing polyester yarns and UHMWPE yarns could be shrunken at 25 degrees Celsius without damaging the UHMWPE yarns.

2. A chemical shrinking agent may shrink a yarn made from a specific fibre material while not shrinking other yarns made from different fibre materials, even if these other yarn types in question would shrink if exposed to another chemical shrinking agent or mix of such chemical shrinking agents, and even if all said yarns types would shrink if exposed to traditional heat-setting. For example, in one application of the present invention a sailcloth containing 2 different types of polyester yarns, Polyethylene terephthalate (PET) and Polyethylene naphthalate (PEN) are shrunken using a specific chemical shrinking agent that will shrink only the PET yarns and not the PEN yarns even though both yarn types would shrink if heat-set. By using a different shrinking agent we would be able to shrink only the PEN yarns and not the PET yarns. The chemical shrinking process is therefore more precise than heat-setting in the sense that a specific yarn type can be a shrinkable yarn using one chemical shrinking agent while the same yarn type may be non-shrinkable when using a different chemical shrinking agent. By using a specific chemical shrinking agent, with ability to shrink one yarn type but not another, it is therefore possible to mix these two yarn types in a hybrid woven sailcloth and shrink one of them while not the other, even though both yarn types would shrink if exposed to traditional heat-setting techniques. Traditional heat-setting, on the other hand, does not offer such possibilities for selective shrinkage of specific yarns. Heat-setting has to be done at a temperature which will effectively shrink a yarn type where shrinkage is desired and the process will also shrink any other yarn type able to shrink at, or below, that specific temperature, if used in the same woven cloth.

3. The chemical shrinking process is controllable in the sense that the effectiveness of a given chemical shrinking agent, or mix of chemical shrinking agents, may be controlled by adjusting the strength of the solution used or by adding certain additives to the shrinking solution which will enhance the effectiveness of the shrinking agent. Using these techniques, the chemical shrinking process is able to shrink certain yarn types more than can safely be obtained by heat-setting, without the heat damaging the yarns. For example, in one application of the present invention we shrink a woven sailcloth, made entirely from nylon yarns, 25% in the warp direction and 10% in the weft direction, without the yarns being damaged or loosing their tensile strength. In a traditional heat-setting process, the temperatures and exposure time needed to cause a similar shrinkage to the woven sailcloth may have caused the yarns to become brittle or could otherwise have damaged the yarns of the sailcloth. The increased shrinkage which is obtainable under this new chemical shrinking technique may, in addition to further improving the stretch resistance in the bias direction of the sailcloth, also increase the modulus of elasticity of the yarns, thus increasing the stretch resistance of the warp and weft directions of the woven sailcloth beyond what could be obtained with traditional heat-setting.

After chemically shrinking the woven sailcloth, it can be further finished using traditional finishing processes such as applying a polymeric resin or a resinous adhesive to further strengthen its bias direction stretch resistance and to reduce its air permissibility.

In the present invention, a hybrid sailcloth is woven from at least 2 different yarn types, i.e. yarns of different chemical compositions or yarns of identical chemical composition but with different properties. The yarns used for the main load bearing direction of the hybrid sailcloth will differ from those used for the stabilising direction by their ability to shrink when exposed to a particular chemical solution. It should be noted that according to the current specification, a yarn's "ability to shrink" or its "shrinkage" should be understood as referring to its ability to shrink along its longitudinal direction. For example, a yarn with a shrinkability or a shrinkage of 10% should be understood as a yarn which when exposed to a particular chemical solution would decrease in length 10%. It should also be noted that different combinations of yarns and chemical solutions will require different process variables in order to achieve its required shrinkability. For example, the period of time in which the yarn is exposed to a chemical solution and the temperature at which the exposure takes place will have an effect on the shrinkability of the yarn. Therefore, when assessing the "shrinkability" of a particular yarn, the chemical solution to which it is exposed, the temperature at which it is exposed and the length of time in which the exposure takes place should be considered.

The stabilising direction of the woven sailcloth will consist of yarns with high shrinking ability, such as 5%-40% shrinkage and preferably between 10% and 15% shrinkage, when exposed to a specific chemical shrinking solution chosen to shrink the woven sailcloth, while the main load-bearing direction of this sailcloth will consist of yarns with low shrinking ability, such as 0%-5% shrinkage, when the woven sailcloth is subsequently exposed to said chemical shrinking solution. Furthermore, all yarns used for the stabilizing direction should preferably have identical shrinking ability, when exposed to said shrinking solution, so as to allow uniform shrinking of all yarns in the stabilising direction of the sailcloth. Similarly, in some applications of the invention the yarns used for the main load-bearing direction should ideally have identical shrinking ability so as to allow uniform, but low, shrinking of the load-bearing direction of the sailcloth but in other applications, due to the stretch resistance trade-off of a hybrid sailcloth, it may be desirable to allow differential shrinkage of the main load-bearing direction yarns in return for further improved bias direction stretch resistance.

Yarns used for the stabilising direction can be any yarn with an adequate ability to shrink when exposed to the chosen chemical shrinking solution, for example:

a. yarns made from polyester fibre such as Polyethylene terephthalate (PET), sold under various trade names such as Dacron, or Polyethylene naphthalate (PEN), sold under the trade name Pentec, or yarns made from polyamide (Nylon), or any other yarn with an adequate ability to shrink when exposed to a chosen chemical shrinking solution.

b. any combination of the above mentioned yarns as long as they all have high and identical, or only insignificant difference in, shrinking ability, when exposed to the chosen chemical shrinking solution.

As will be understood by those skilled in the art, a difference in shrinking ability between 2 types of yarns used in combination in the stabilising direction can be considered insignificant if the yarns do not cause significant differential shrinkage of the woven sailcloth in its stabilising direction when exposed to the chemical shrinking solution, i.e. due to the density of the woven sailcloth limiting the potential shrinkage of the yarns to below the shrinking ability of both yarns or due to one yarn having high shrinking ability but low shrinking force.

Yarns used for the main load-bearing direction can be any yarn with low shrinking ability, when exposed to the chosen chemical shrinking solution, such as:

Yarns made from low-stretch fibres such as aromatic polyamide, sold under trade names such as Kevlar, Twaron and Technora, or from Vectran; an aromatic polyester produced by Kuraray Co, or from carbon fibre or from PBO, sold the trade name Zylon.

Yarns made from low-stretch fibres with low melting point such as Ultra high molecular weight polyethylene (UH-MWPE), sold under the trade names Spectra and Dyneema.

Yarns made from polyester fibre, such as Polyethylene terephthalate (PET), or Polyethylene naphthalate (PEN), or yarns made from polyamide (nylon) fibre, for as long as they will have low shrinking ability when exposed to the chemical shrinking solution chosen for shrinking the yarns used for the stabilizing direction of the woven sailcloth, even though such yarns can have high shrinking ability when exposed to a different chemical shrinking solution.

Yarns which normally have high shrinking ability when exposed to the chosen chemical shrinking solution, such as Polyethylene terephthalate (PET), Polyethylene naphthalate (PEN), or nylon yarns, but which have been pre-shrunk, prior to weaving, so that no additional shrinkage, or only low shrinkage, will occur when exposed to the chosen chemical shrinking solution.

Any combination of the above mentioned yarns, as long as any differential shrinking ability, when exposed to the chosen chemical shrinking solution, is considered and found desirable or acceptable for the application.

Under the present invention, the hybrid sailcloth is woven in a traditional way, using, where applicable, traditional means of improving the stretch resistance in the bias direction, such as using finer yarns and weaving a denser weave. After weaving, the sailcloth should ideally be washed in a mild detergent in order to remove various oils and residues from the yarn spinning and the weaving processes which may otherwise reduce the efficiency of the chemical shrinking agent or mixture of chemical shrinking agents. After drying the sailcloth at low temperatures, so as not to cause any shrinkage of the yarns, the cloth should be led through a bath of the chosen chemical shrinking solution. To secure uniform shrinkage of the sailcloth it may be advantageous to use a forced application technique, such as a mechanical padding technique or a pressurised application technique, to work the chemical shrinking solution well into the sailcloth. In order to control the shrinkage of the sailcloth, the concentration and temperature of the chemical shrinking solution may be varied, as may also the time of exposure to the chemical shrinking solution. For practical purposes, the woven sailcloth should be exposed to the shrinking solution for up to 30 minutes and ideally between 10 seconds and 2 minutes.

After exposure to the shrinking agent, the sailcloth should either be rinsed in water or, if necessary, the shrinking solution should be chemically neutralised. The washing, shrinking, rinsing, and drying processes can be done in separate steps or they can be part of a continuous line set-up. Most importantly, all these procedures should preferably be done with the woven sailcloth running flat over rollers so as not to cause any unintended tension that may damage the cloth or cause uneven shrinkage of the sailcloth. Depending on the particular application of the sailcloth, i.e. whether it will be intended for radial-cut or for cross-cut sail panels, it may be advantageous to apply tension to the sailcloth during the shrinking process, either in its warp or its weft direction.

The shrunken sailcloth can subsequently be further finished, using traditional finishing methods such as application of a polymeric resin or a resinous adhesive to further support the sailcloth.

It should be noted that a chemical shrinking agent for the yarns used in the stabilising direction of the sailcloth could in principle be added to the finishing resin in which case the shrinking and finishing steps could be combined into one single integrated step.

In the following, three specific examples are described which show different embodiments of the method according to the invention. These examples are just for example purposes and should not be used to limit the scope of protection as specified in the claims.

EXAMPLE 1

Figure 4:
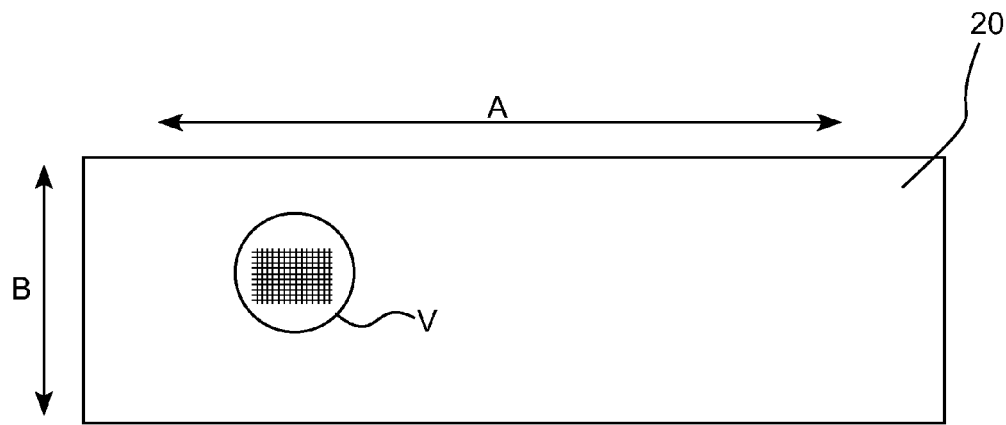
FIG. 4 shows a schematic view of a first embodiment of a sailcloth made according to the current invention.
Figure 5:
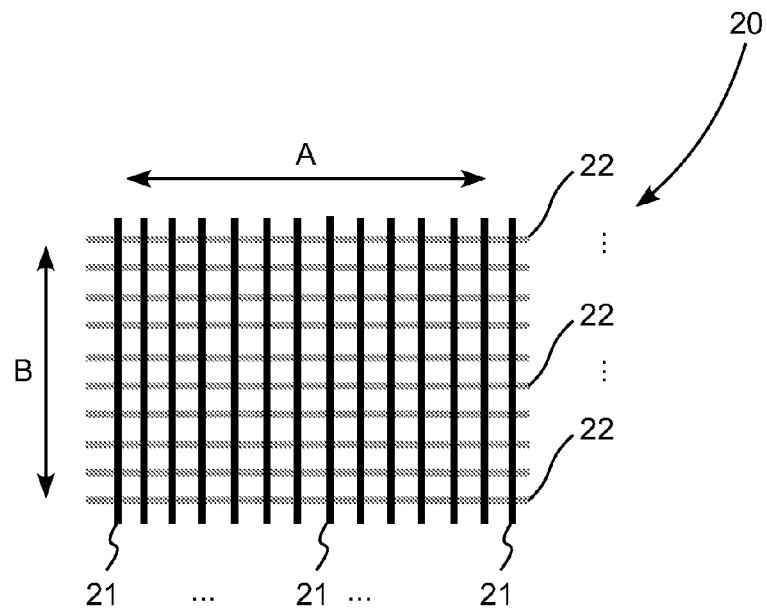
FIG. 5 shows a close-up schematic view of the area marked by V in FIG. 4.

In one application of the present invention, a sailcloth 20, shown in FIGS. 4 and 5, intended for radial-cut sail panels and suitable for large yachts are made. As the sailcloth will be intended for radial-cut sail panels its main load-bearing direction will be the warp direction A whereas its weft direction B will be the stabilising direction which will subsequently be chemically shrunk. For this stabilising direction we will use yarns 21 made from polyester (PET) fibres as these are shrinkable when exposed to specific chemical shrinking agents. For the warp direction we will entirely use yarns 22 made from UHMWPE fibres, in this case Spectra fibres, due to their high tensile strength and high modulus of elasticity.

The sailcloth is woven as a plain but dense weave, using Spectra yarns of 275 Denier, for the warp direction and polyester (PET) yarns of 500 Denier, such as Diolen 57T, supplied by Polyamide High Performance GmbH, for the weft direction. The cloth will be woven while maintaining a high tension on the warp fibres so as to minimize their crimp. After weaving, the cloth is then washed in a detergent to remove oils and other residues from the yarn spinning and weaving processes which may hamper the chemical shrinking agent in shrinking the polyester yarns sufficiently. The cloth is subsequently rinsed in water and dried at low temperature so as not to cause any damage to the UHMWPE yarns or any shrinkage of the polyester yarns. The woven sailcloth is now fed through a series of rollers leading it through a bath where it will be submerged into the chosen chemical shrinking solution for a period of time of between 1 to 2 minutes. The chemical shrinking solution is applied to the woven cloth by either a mechanical padding technique or by a pressurised system, so as to ensure an even distribution of the shrinking solution throughout the sailcloth and an even shrinkage of the sailcloth. Furthermore, the sailcloth should ideally be shrunk under some tension applied to its warp direction, in order to avoid crimp of the warp fibres when the weft fibres are shrunk. Such tension will be applied to the sailcloth by a system of adjustable friction applied to the rollers leading the cloth in and out of the shrinking bath. Such a system of applied friction may also be used to further stretch the warp yarns, prior to shrinking, in order to straighten the warp fibres further, beyond what can be obtained from weaving techniques. Straighter warp yarns will further increase the stretch resistance of the warp direction as the warp fibres would otherwise straighten when load is applied to the finished sail.

The chemical shrinking agent used in this particular example is Dichloromethane which is a known shrinking agent for certain polyesters such as Polyethylene terephthalate (PET). Other chemical shrinking agents, such as other halogenated aliphatic hydrocarbons, for example ethylene dichloride, chloroform, tetrachloroethane and methylene dichloride could likewise be used and may cause different shrinkage of the PET yarns. Also trichloroacetic acid could be of interest as a shrinking agent due to its water solubility. Different chemical solutions suitable for shrinking certain types of fibres are disclosed in U.S. Pat. No. 3,853,462 and in U.S. Pat. No. 3,228,745. When immersed into a bath of Dichloromethane, the polyester yarns used in the weft direction will shrink while the Spectra yarns used in the warp direction will be left unaffected by the shrinking agent, causing the woven hybrid sailcloth to shrink uniformly in its weft direction but not in its warp direction. In laboratory experiments, Polyester (PET) yarns were shrunk 13% in its longitudinal direction when exposed to Dichloromethane for about 1 minute, which normally would be considered sufficient. However, if additional shrinkage is desired, or if less than ideal shrinkage is obtainable in the actual production setup, the shrinking ability of the chemical shrinking solution can be improved by adding an acidic organic component to the shrinking solution, such as hexaflouroisopropanol which is a solvent for polyester. In laboratory experiments the shrinkage of polyester yarns was increased from 13% to 16% by adding 1% by weight of hexaflouroisopropanol to the shrinking solution. By increasing the amount of hexaflouroisopropanol up to 10% per weight of the shrinking solution, shrinkage of the polyester (PET) yarns can be increased even further. When shrinking the woven sailcloth, other factors, such as the density of the weave and the tension of the various yarns in the weave, will also influence the amount of shrinkage that can be obtained from a given shrinking solution. Therefore, the ideal composition of the chemical shrinking solution can best be decided upon after testing one or more compositions on the specific sailcloth it is desired to shrink. In this particular application, using the yarns specified above, as a starting point, a shrinking solution consisting of 97% by weight of Dichloromethane and 3% by weight of hexaflouroisopropanol is used but one may increase the amount of hexaflouroisopropanol in the solution up to 6% by weight, in order to shrink the sailcloth at least 8%, and ideally 10-15%, in its weft direction.

In this application of the present invention, the sailcloth is shrunk only in its stabilising direction, while the main load-bearing direction is not shrunk. The bias direction stretch resistance is thus improved, due to the higher density of the sailcloth, without causing different tension in yarns running in one single direction and consequently without adversely affecting the warp or weft direction stretch resistance. Furthermore, one of the advantages of the present invention is illustrated, as the sailcloth is shrunk without damaging or melting the Spectra yarns. Had the woven sailcloth, made in this application of the invention, been shrunk using traditional heat-setting technique, the Spectra yarns would have either melted or been severely damaged in the process.

After shrinking, rinsing and drying the sailcloth, it can be further finished like any other woven sailcloth, by applying a resin or adhesive that will fill the gaps between the warp and weft yarns and further improve the bias direction stretch resistance as well as minimising the porosity of the of the sailcloth.

EXAMPLE 2

Figure 6:
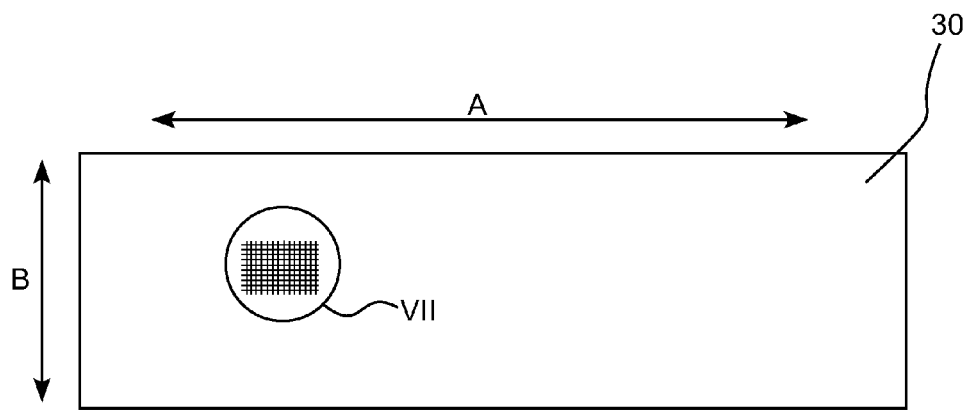
FIG. 6 shows a schematic view of a second embodiment of a sailcloth made according to the current invention.
Figure 7:
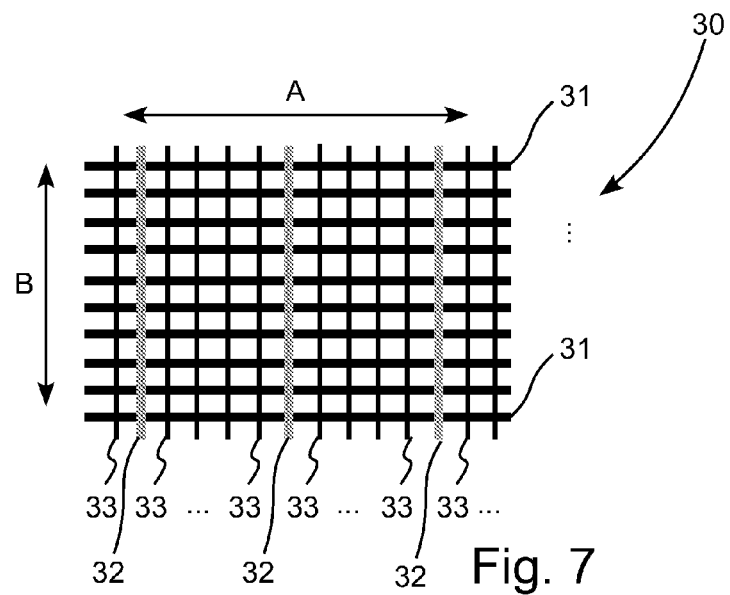
FIG. 7 shows a close-up schematic view of the area marked by VII in FIG. 6.

In another application of the present invention, a sailcloth 30, see FIGS. 6 and 7, suitable for medium sized yachts and intended for cross-cut sail panels are made, using the new chemical shrinking technique. As the sailcloth will be intended for cross-cut sail panels, its main load-bearing direction will this time be the weft direction B while its stabilising direction will this time be the warp direction A of the sailcloth. For the stabilising direction we will again use yarns 31 made from polyester (PET) fibres, namely Diolen T57 of 280 dtex, as these will shrink sufficiently when exposed to the chosen chemical shrinking solution. For the weft direction we will use Dyneema yarns 32 of 400 denier, due to their high tensile strength and high modulus of elasticity, but this time mixed with yarns 33 made from polyester (PEN) fibres. For this specific applications we will use Pentec yarns of 500 denier and the mix will be 1 Dyneema yarn for every 4 Pentec yarns. The sailcloth will be woven as a plain but dense weave, but without the high tension in the warp yarns as was the case in the prior example. After weaving, the sailcloth will be washed and dried, then led through a bath of the chosen shrinking solution. The sailcloth should ideally be shrunk with only little tension being put on its warp direction as this direction of the sailcloth is intended to shrink when exposed to the shrinking solution. Instead, it may be advantageous to apply tension to the weft direction of the cloth so as to avoid crimp in the weft yarns when the cloth is being shrunk. This can be done by using readily available machinery well known to those skilled in the art of sailcloth manufacturing.

As in example 1, the chemical shrinking agent will be Dichloromethane while other chemical shrinking agents may be equally useful and may shrink the sailcloth more or less than will Dichloromethane. When immersed into a bath of Dichloromethane, the polyester (PET) yarns used in the warp direction of the sailcloth will shrink while neither the Dyneema yarns, nor the polyester (PEN) yarns used in the weft direction will shrink, causing the woven hybrid sailcloth to shrink uniformly in its warp direction but not in its weft direction.

As in the previous example, the shrinkage of the PET yarns can be enhanced by adding a solvent for polyester, such as hexaflouroisopropanol, to the shrinking solution. In the present application we will use, as a starting point, a shrinking solution consisting of 97% by weight of Dichloromethane and 3% by weight of hexaflouroisopropanol but we may increase the amount of hexaflouroisopropanol in the solution in order to shrink the sailcloth at least 8% and ideally 10-15% in its warp direction. As in example 1, the shrunken sailcloth can be further finished, using traditional finishing methods such as application of a resinous adhesive to further increase the bias direction stretch resistance of the sailcloth.

In this application of the invention, the bias direction stretch resistance is improved, due to the higher density of the sailcloth, without adversely affecting the warp or weft direction stretch resistance. Also, the shrinking of the sailcloth is done without damaging or melting the Dyneema (UHMWPE) yarns. Furthermore, another advantage of the present invention is illustrated in this example, as Polyethylene terephthalate (PET) yarns are shrunk considerably without affecting or shrinking the Polyethylene naphthalate (PEN) yarns. This would not be possible using traditional heat-setting techniques as the temperature needed to shrink the one yarn would also shrink the other. The stretch resistance trade-off, which would be present under traditional heat-setting, does not apply to this example, simply because the two yarns used in the weft direction, while having different shrinking abilities when heat-set, have no shrinking abilities when exposed to the chosen shrinking solution.

EXAMPLE 3

Figure 8:
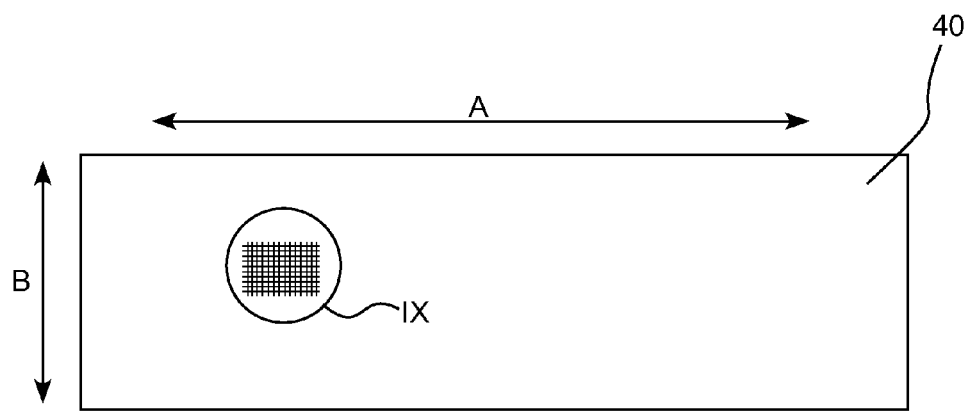
FIG. 8 shows a schematic view of a third embodiment of a sailcloth made according to the current invention.
Figure 9:
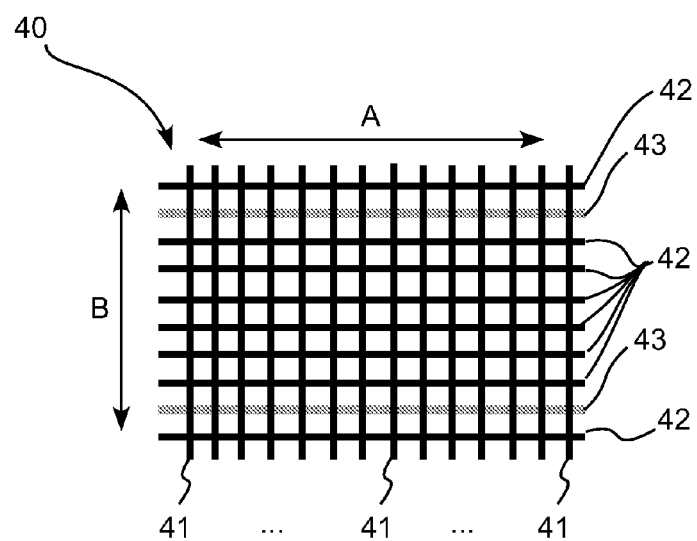
FIG. 9 shows a close-up schematic view of the area marked by IX in FIG. 8.

In yet another application of the present invention, a spinnaker cloth 40, see FIGS. 8 and 9, suitable for large yachts and intended for radial-cut sail panels is woven. As in example 1, the weft direction B will be the stabilising direction while the warp direction A will be the main load-bearing direction. For the stabilising direction nylon yarns 41 are used, due to their high ability to shrink when exposed to the chosen shrinking solution and also due to their fairly low modulus of elasticity even after shrinkage and thus their ability to absorb sudden load without breaking. For the warp direction we will use yarns 42 made from polyester (PET) fibre mixed with yarns 43 made from UHMWPE, in this case Dyneema yarns. The mix will be 1 Dyneema yarn for every 6 polyester yarns. The cloth will be woven as plain weave but with a rip-stop yarn built into the weave, as is common for spinnaker materials. Before weaving, the PET yarns will be pre-shrunk using a somewhat milder chemical shrinking solution such as dichloromethane without any addition of a solvent component. This pre-shrinking of the yarns can be done by leading the yarn through a bath of the shrinking solution and then through a rinsing bath. This pre-shrinking of the polyester yarns is done to limit, but not completely prohibit, any residual shrinkage of the yarns, when later exposed to the shrinking solution chosen for shrinking the woven sailcloth.

After weaving, the sailcloth will be washed and dried, then led through a bath of another shrinking solution, this time a mixture of dichloromethane and a minor share, such as 1% by weight, of hexaflouroisopropanol, which has a high ability to shrink nylon yarns. The shrinking solution, having a slightly better ability to shrink polyester (PET) yarns than the shrinking solution that was used to pre-shrink the PET yarns, will be able to further shrink the pre-shrunk polyester yarns. The additional shrinkage that can be expected will be about 2% but if necessary, more hexaflouroisopropanol can be added to the solution which will increase the additional shrinkage of the polyester yarns.

When the woven sailcloth is exposed to the chosen shrinking solution the nylon yarns in the weft direction of the sailcloth will shrink considerably, ideally between 12-20% while the polyester (PET) yarns used in the warp direction can be expected to shrink about 2%. The UHMWPE yarns also used in the warp direction will not shrink and the shrinking process therefore causes different tension between yarns running in one single direction, namely between the UHMWPE and the PET yarns running in the warp direction.

This difference in tension between the PET yarns and the UHMWPE yarns will improve the bias direction stretch resistance of the cloth, while causing a lower initial stretch resistance of the warp direction than what it would have been, had the PET yarns not been shrunk. This is due to the fact that when first stretched, the UHMWPE yarns won't absorb any tension since they are longer than the shrunken PET yarns. First at the point where the PET yarns are stretched to the length of the UHMWPE yarns will the UHMWPE yarns begin to contribute to the stretch resistance of the woven cloth. While this lower initial stretch resistance of the warp direction in many applications would be a disadvantage and a necessary compromise to further improve the bias direction stretch resistance, it is, in this particular application of the invention, an advantage and a purposely designed feature of the woven spinnaker cloth. Particularly spinnakers are subject to sudden shock from wind force, and some initial elasticity of the sailcloth is therefore desired, for the sail to better absorb such loads without tearing.

Other Applications of the Invention

The woven sailcloth manufactured under the present invention will be suitable for any yacht sail where high stretch resistance combined with low weight is desirable. The woven sailcloth can be readily cut into sail panels and assembled to sails.

It should be noted that the term "woven sailcloth" when used in the current specification should be clear to the person skilled in the art of sailmaking and should be limited to woven cloths which are suitable for use in sails for sailboats. While it could be argued that all woven cloths could be used as a sailcloth in some form or the other, it should also be acknowledged that a cloth which is designed to be used in a sail, has a set of properties which make it especially suitable for use in sails. Therefore, while many woven cloths could in some form be used as a sailcloth, only some woven cloths would be considered as suitable for use as a sailcloth. It is maintained that the person skilled in the art of sail making can distinguish between woven cloths which are suitable for use in sails and those which are not.

Another application would be to use the sailcloth in a lighter version, as manufactured under the present invention, as load-bearing, supporting, protecting or stabilising layers in laminated sailcloth, whether used outside or between the laminating films. Light woven layers of traditional construction are already being used in laminated sailcloth and it is likely that the advantages of the present invention will also find their way to this area of sailcloth manufacturing. In particular it will be noted that a woven sailcloth according to the current invention could be used as a main load bearing layer of a laminate sail. In current laminate sails, woven layers are used to give stabilization and protection to the different layers of the sail, but the main loads are born by specifically placed yarns in the laminate of the sail. When using a sailcloth according to the current invention, the main load bearing direction of the woven sailcloth could be arranged in the direction of a main load direction of the sail and thereby contribute significantly to the strength of the sail. This would allow the yarn count of the specifically placed yarns to be decreased and allow thinner laminate sails to be made with lower yarn count, especially at the corners of the sail. In another embodiment of a laminate sail, two or more layers of woven sailcloth according to the invention are used, the main load bearing directions of the two or more layers of woven sailcloth being arranged along two or more different load directions of the sail.

While the above description has specifically mentioned sails for yachts, the sailcloth according to the current invention can also be used for other purposes, for example awnings, parachutes, paragliders, kites, etc. . . .

The invention claimed is:

1. A method of making a woven sailcloth comprising the steps of:
    providing a first set of yarns, comprising at least partially a first type of yarn,
    providing a second set of yarns, comprising at least partially a second type of yarn,
    weaving the first set of yarns and the second set of yarns such that the first set of yarns are arranged along a first direction and the second set of yarns are arranged along a second direction which is different from the first direction and such that all the yarns arranged along the first direction come from the first set of yarns and all the yarns arranged along the second direction come from the second set of yarns, and
    exposing the woven sailcloth to a chemical solution which has the property of shrinking the first type of yarn in its longitudinal direction more than the second type of yarn when said woven sailcloth is exposed to said chemical solution and where the types of yarns which make up the first set of yarns are chosen such that the difference in the actual longitudinal shrinkage of the yarns which make up the first set of yarns in the woven sailcloth is less than 3% and where the types of yarns which make up the second set of yarns are chosen such that the difference in the actual longitudinal shrinkage of the yarns which make up the second set of yarns in the woven sailcloth is less than 3% when said woven sailcloth is exposed to said chemical solution.

2. The method of claim 1, wherein the yarns which make up the first set of yarns have a longitudinal shrinkability of between 5% and 40% when exposed to said chemical solution and in that the yarns which make up the second set of yarns have a longitudinal shrinkability of between 0% and 5% when exposed to said chemical solution.

3. The method of claim 2, wherein the first set of yarns, the second set of yarns, the weaving process and the chemical solution are arranged such that the actual longitudinal shrinkage of the first set of yarns in the woven sailcloth is greater than the actual longitudinal shrinkage of the second set of yarns in the woven sailcloth when the woven sailcloth is exposed to said chemical solution.

4. The method of claim 3, wherein the actual longitudinal shrinkage of the first set of yarns is at least twice that of the second set of yarns.

5. The method of claim 4, wherein the first type of yarn has a different chemical composition than the second type of yarn.

6. The method of claim 5, wherein the second set of yarns at least partially comprises a type of yarn made at least partially from a fiber with an initial specific modulus of elasticity of over 400 grams/denier.

7. The method of claim 6, wherein the fibers with an initial specific modulus of elasticity of over 400 grams/denier are chosen from the group of Carbon and UHMWPE fibers.

8. The woven sailcloth manufactured of claim 7.

9. The woven sailcloth of claim 7, wherein the yarn with an initial specific modulus of elasticity of over 400 grams/denier is made at least partially from fibers chosen from the group of Carbon or UHMWPE.

10. A woven sailcloth comprising a first set of yarns arranged in a first direction and a second set of yarns arranged in a second direction which is different from the first direction and where all the yarns arranged along the first direction come from the first set of yarns and all the yarns arranged along the second direction come from the second set of yarns, and where the first set of yarns comprises at least partially a first type of yarn and the second set of yarns comprises at least partially a second type of yarn and where the first and second set of yarns are woven together, wherein the woven sailcloth has been exposed to a chemical solution after the weaving process was complete which caused the first type of yarn to shrink in its longitudinal direction more than the second type of yarn in its longitudinal direction and where the difference in the actual longitudinal shrinkage of the yarns which make up the first set of yarns in the woven sailcloth is less than 3% and where the difference in the actual longitudinal shrinkage of the yarns which make up the second set of yarns in the woven sailcloth is less than 3%.

11. The woven sailcloth according to claim 10, wherein the first set of yarns have shrunken more in their longitudinal direction than the second set of yarns.

12. The woven sailcloth of claim 10, wherein the first type of yarn is a polyester or nylon yarn and the second type of yarn is a yarn with an initial specific modulus of elasticity of over 400 grams/denier and where the second set of yarns further comprises a third type of yarn which is a polyester or a nylon yarn and in that the first type of yarns have been shrunken in their longitudinal direction after the weaving process was complete and in that the third type of yarn has not been shrunken.

13. The woven sailcloth of claim 10, wherein the second type of yarn is UHMWPE yarn, and in that the first set of yarns have been shrunken after the completion of the weaving process.

14. The laminated sailcloth where one of the layers of the laminated sailcloth is a woven sailcloth of claim 10.

15. A sail made at least partially from a sailcloth of claim 10.

16. The sail of claim 15, wherein the sailcloth is arranged such that the second set of yarns are arranged essentially parallel to one of the estimated main load bearing directions of the sail.

* * * * *

UNITED STATES PATENT AND TRADEMARK OFFICE
CERTIFICATE OF CORRECTION

PATENT NO. : 8,720,356 B2  Page 1 of 1
APPLICATION NO. : 13/380430
DATED : May 13, 2014
INVENTOR(S) : Claus S\onderborg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this

Twenty-ninth Day of September, 2015

Michelle K. Lee
*Director of the United States Patent and Trademark Office*